US009701868B2

(12) United States Patent
Iezzi

(10) Patent No.: US 9,701,868 B2
(45) Date of Patent: *Jul. 11, 2017

(54) SINGLE-COMPONENT MOISTURE-CURABLE COATINGS BASED ON N-SUBSTITUTED UREA POLYMERS WITH EXTENDED CHAINS AND TERMINAL ALKOXYSILANES

(71) Applicant: Erick B. Iezzi, Alexandria, VA (US)

(72) Inventor: Erick B. Iezzi, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/749,710

(22) Filed: Jun. 25, 2015

(65) Prior Publication Data
US 2015/0291837 A1    Oct. 15, 2015

Related U.S. Application Data

(63) Continuation of application No. 14/187,568, filed on Feb. 24, 2014, now Pat. No. 9,139,753.

(60) Provisional application No. 61/781,719, filed on Mar. 14, 2013.

(51) Int. Cl.
| | | |
|---|---|---|
| C09D 175/02 | (2006.01) | |
| C09D 183/08 | (2006.01) | |
| C08G 18/73 | (2006.01) | |
| C09D 175/04 | (2006.01) | |
| C08G 18/28 | (2006.01) | |
| C08G 18/32 | (2006.01) | |
| C09D 175/00 | (2006.01) | |

(52) U.S. Cl.
CPC ......... *C09D 175/02* (2013.01); *C08G 18/289* (2013.01); *C08G 18/3234* (2013.01); *C08G 18/73* (2013.01); *C09D 175/04* (2013.01); *C09D 183/08* (2013.01); *C09D 175/00* (2013.01)

(58) Field of Classification Search
None
See application file for complete search history.

(56) References Cited

U.S. PATENT DOCUMENTS

| | | | | |
|---|---|---|---|---|
| 3,903,052 A  * | 9/1975 | Wagner | ................ | C08G 18/798 521/54 |
| 6,117,552 A  * | 9/2000 | Hanada | .................... | B41M 5/52 428/32.34 |
| 6,281,322 B1 * | 8/2001 | Groth | ................... | C08G 18/282 106/287.11 |
| 7,094,859 B2 * | 8/2006 | Schindler | ............... | C08G 18/10 528/21 |
| 8,173,742 B2 * | 5/2012 | Bernard | ................ | C07F 7/1836 524/588 |

(Continued)

*Primary Examiner* — Robert S Loewe
(74) *Attorney, Agent, or Firm* — US Naval Research Laboratory; Rebecca L. Forman

(57) ABSTRACT

Moisture-curable single-component (1K) coatings based on N-substituted urea polymers with extended chains and terminal alkoxysilane groups. The coatings are highly flexible, are gloss retentive, provide fast tack-free and dry-through times, provide high solvent resistance, and provide excellent exterior color stability to sunlight. The coatings can be formulated to produce high-gloss, semi-gloss and low-gloss finishes, and thus have application as both commercial and military coatings.

30 Claims, 4 Drawing Sheets

(56) References Cited

U.S. PATENT DOCUMENTS

| | | | | |
|---|---|---|---|---|
| 2007/0129527 A1* | 6/2007 | Griswold | ............... | C08G 18/10 528/64 |
| 2009/0099291 A1* | 4/2009 | Jia | ...................... | C08G 18/3893 524/425 |
| 2009/0171040 A1* | 7/2009 | Griswold | ............. | C08G 18/289 525/452 |
| 2011/0319555 A1* | 12/2011 | Iezzi | .................... | C09D 175/02 524/588 |
| 2012/0295079 A1* | 11/2012 | Rocas Sorolla | ..... | C08G 18/282 428/196 |
| 2014/0249273 A1* | 9/2014 | Webb | ................... | C09D 183/00 524/868 |

\* cited by examiner

SINGLE-COMPONENT MOISTURE-CURABLE COATINGS BASED ON N-SUBSTITUTED UREA POLYMERS WITH EXTENDED CHAINS AND TERMINAL ALKOXYSILANES

PRIORITY CLAIM

The present application is a continuing application of U.S. application Ser. No. 14/187,568, filed on Feb. 24, 2014 by Erick B. Iezzi, entitled "SINGLE-COMPONENT MOISTURE-CURABLE COATINGS BASED ON N-SUBSTITUTED UREA POLYMERS WITH EXTENDED CHAINS AND TERMINAL ALKOXYSILANES," which claimed the benefit of U.S. Provisional Application No. 61/781,719, filed on Mar. 14, 2013 by Erick B. Iezzi, entitled "IMPROVED FLEXIBILITY, GLOSS RETENTION AND ADHESION OF SINGLE-COMPONENT TOPSIDE COATINGS BASED ON N-SUBSTITUTED UREAS WITH TERMINAL ALKOXYSILANES AND SECONDARY DIAMINE LINKAGES," the entire contents of each are incorporated herein by reference.

BACKGROUND OF THE INVENTION

Field of the Invention

The present invention relates to moisture-curable single-component (1K) topcoat coatings.

Description of the Prior Art

The U.S. Navy's predominant topside coatings are haze gray semi-gloss silicone alkyds. These coatings have been used on the topsides (freeboard and superstructure) of surface ships by the Navy since the early 1960s. Silicone alkyd coatings are considered "user friendly" in that they are single-component (all-in-one can) paints that have an indefinite pot-life in a closed can, have been reformulated to maintain compliance with volatile organic compound (VOC) limits, and will cure even under the most adverse conditions. Unfortunately, these user-friendly paints have several inherent limitations, which include color fading, chalking, loss of gloss, limited resistance to shipboard hydrocarbons, and limited surface hardness that makes running rust and soot staining extremely difficult to remove. In addition, peeling, cracking and delamination of cured silicone alkyds can often result due to application over inadequately prepared surfaces.

Silicone alkyd coatings can be formulated as single-component (1K) systems because they contain unsaturated fatty acid groups that crosslink in the presence of atmospheric oxygen. The coatings do not begin to cure until they are applied to a surface and the solvent evaporates, thereby possessing essentially a limitless pot-life in a closed can. For Navy ships, silicone alkyd topside coatings are specified as a Haze Gray color with a semi-gloss finish, are available in a variety of volatile organic compound (VOC) levels (e.g., 340 g/L, 250 g/L), and have a service-life of approximately 6-12 months. Frequently, silicone alkyd coatings need to be touched-up or repaired (e.g., via roller or brush), yet this mundane task would not be required if silicone alkyd coatings did not easily fade, discolor, peel/delaminate or stain within a few months after application. A single application of silicone alkyd is specified at 2-5 mils dry film thickness (DFT); however, due to the constant over-coating for maintenance, it is not uncommon for surfaces to possess greater than 50 mils of topside coating.

Although Navy surface ships utilize silicone alkyd topcoats, the majority of topcoats used by the Navy are polyurethanes. Polyurethanes are formed by reaction of an isocyanate-functional material with a hydroxyl-functional material (e.g., polyester polyol or water), and are used to provide protective camouflage, exterior color stability, flexibility, chemical warfare agent resistance, hydrocarbon resistance and chemical resistance. Polyurethane topcoats can be two-component systems or single-component systems. Polyurethane topcoats contain toxic isocyanates that can cause serious health issues for both coating applicators and the environment, and non-isocyanate alternatives that offer equal or greater performance are of high interest. Furthermore, two-component coatings require the mixing of components before application, which can result in insufficient cure times, reduced hardness, poor adhesion, and poor appearance if applicators do not mix the materials correctly. Two-component coatings also have a limited pot-life, which is an issue for individuals performing touch-up and repair applications. For these reasons, single-component coatings are favored over two-component systems.

Polysiloxane-based coatings have an inherent durability advantage over traditional organic-based materials due to the presence of silicon-oxygen bonds. The Si—O bond, which has a bond enthalpy of 110 kcal/mol, is stronger than the carbon-hydrogen (99 kcal/mol) and carbon-carbon (83 kcal; mol) bonds found in organic coatings, thereby leading to an increase in thermal stability and resistance to oxidative degradation by sunlight. Polysiloxanes, like many silicon-based materials, are relatively non-toxic to humans, especially when compared to the health issues associated with isocyanate-containing materials.

Two-component (2K) polysiloxane coatings are based on materials that contain both reactive organic groups and moisture-curable alkoxysilane groups. These coatings are often referred to as "hybrid cure coatings," where one portion of the coating is crosslinked by the ambient reaction between organic groups, such as amines and epoxies, while the other portion forms a siloxane network via moisture hydrolysis of the alkoxysilane groups and condensation of the resulting silanols. These coatings offer good exterior durability, hardness, chemical resistance, and direct-to-metal adhesion. However, they can suffer from photooxidation and yellowing due to the presence of amines, which affects the long-term color and gloss stability of these coatings. Similar to two-component polyurethanes, these materials suffer from poor application appearance and performance if not mixed correctly by applicators, not to mention the limited pot-life and waste associated with a two-component system.

Single-component polysiloxane coatings are traditionally based on acrylic-silane polymers. These polymers are manufactured via radical polymerization of gamma-methacryloxypropyltrimethoxysilane with methyl methacrylate, hexyl acrylate or other organic monomers to form linear copolymers with pendant alkoxysilane groups. The copolymers are high in molecular weight and require significant quantities of solvent(s) to solubilize the large polymer chains, thus making it difficult to generate low VOC coatings. The pendant alkoxysilane groups are the only reactive functionalities on the copolymer, which enables the coating to be cured via moisture hydrolysis and condensation. Single-component coatings based on these polymers are available on the commercial market from several manufacturers, although they are not without their drawbacks. For instance, these coatings are slow to hydrolyze and crosslink (cure) at room temperature when not exposed to high humidity environments, and they display poor chemical resistance when not fully cured due to the low crosslink density within the coating. These issues result because the acrylic-silane copolymers in the coating contain pendent propyltrialkoxysilane groups that are inherently slow to hydrolyze and limited in quantity when compared to the non-reactive groups in the copolymer backbone. Acrylic-silane binders often possess glass transition temperatures (Tgs) above room temperature in order to provide fast dry-to-touch times (e.g., 1-3 hours), even though the cross-linking reaction between polymers is slow to occur.

Single-component moisture-curable coating compositions were disclosed in U.S. Pat. No. 6,288,198. These coatings are based on aliphatic polyisocyanate-aminosilane adducts, where greater than 70% of the isocyanate groups are reacted with an aminosilane, which is then combined with a hydrolysable silane to form a hybrid sol-gel coating. It is stated that these sol-gel coatings provide hard, abrasion-resistant and solvent-resistant surfaces, which is expected for highly-crosslinked coatings, especially those that contain small hydrolyzable silanes. However, the reported flexibility is only a 90 degree bend, not a 180 degree bend, which is the norm when referring to a highly flexible coating. Furthermore, the preferred coating dry film thickness is only 2-30 microns, which is significantly less than what is utilized for most commercial and military coatings. An additional drawback to these coating compositions are that the high content of moisture-curable silane groups within the coatings leads to a continual reduction in gloss over time as the coating post-cures with moisture.

Single-component moisture-curable coatings were also disclosed in U.S. Pat. No. 8,133,964, and are based on similar aliphatic polyisocyanate-aminosilane adducts as those discussed above (paragraph [0009]). However, these adducts are formed by reacting polyisocyanates with 2:1 or 1:2 ratios of N-substituted aminosilanes and di-substituted mono-functional amines. Reactive diluents, such as hydrolyzable silanes or polysiloxanes could also be utilized. The di-substituted mono-functional amines reduced the amount of hydrolysable silane groups on the polyisocyanate-aminosilane adduct, but the overall high concentration of moisture-curable silane groups in the coating yielded topcoats with only slightly better flexibility than coatings reported in U.S. Pat. No. 6,288,198. The coatings still provided good solvent resistance, high hardness and low VOCs. Additional drawbacks of these coatings are that the high content of moisture-curable groups leads to a continual reduction in gloss over time as the coatings post-cure with moisture, and that the use of the di-substituted mono-functional amines results in slow tack-free and dry-through times for the coatings.

BRIEF SUMMARY OF THE INVENTION

The present invention relates to moisture-curable single-component coatings that are highly flexible, are gloss retentive, provide fast tack-free and dry-through times, provide good adhesion, are highly resistant to solvents, and offer excellent exterior color stability to sunlight. The solution is provided by synthesizing N-substituted urea polymers with extended chains and terminal alkoxysilane groups, then formulating into moisture-curable single-component coatings. The coating formulations can also comprise reactive diluents, pigments, fillers, solvents, additives and a catalyst. These single-component coatings can be applied over a substrate via spray, brush or roll application methods.

The single-component coatings of the present invention provide greater exterior stability, adhesion, solvent resistance, flexibility and lower VOC content than the silicone alkyd topside coatings currently utilized on Navy ships. These coatings are also isocyanate-free, in that the N-substituted urea polymers with extended chains and terminal alkoxysilanes, including the reactive diluents and additives, contain no unreacted isocyanate groups. These coatings can be formulated to provide high-gloss, semi-gloss and low-gloss finish coatings, and thus have application as coatings for use on commercial and military assets (e.g., ships, aircraft, ground vehicles and submarines).

The high flexibility of the herein coatings result from N-substituted urea polymers with extended chains and terminal alkoxysilanes that are synthesized utilizing aliphatic or cycloaliphatic secondary diamine chain extenders, and also by limiting the amount of reactive alkoxsilane groups on the polymers. The N-substituted urea linkages formed during reaction of these chain extenders with isocyanates provides for greater flexibility than if forming non-N-substituted ureas. The N-substituted group on the urea causes steric interactions within the linkage, and these interactions are minimized by the N-substituted group rotating slightly out of plane. N-substituted urea linkages, as opposed to non-N-substituted, also provide for polymers with reduced viscosity due to less inter- and intra-molecular hydrogen bonding between ureas. This in turn allows for polymers with reduced solvent content, and hence higher solids content, to be synthesized. The use of N-substituted urea polymers also allow for single-component coatings with lower volatile organic compounds (VOCs) to be formulated. All newly formed urea linkages within the polymers are N-substituted, including those located near the terminal alkoxysilane groups.

The fast tack-free times for the herein single-component coatings are achieved by using N-substituted urea polymers with extended chains and terminal alkoxysilanes that possess glass transition temperatures near or above room temperature. These glass transition temperatures result from addition of the secondary diamine chain extenders during polymer synthesis, which forms larger molecules, such as dimers and trimers, and thus increases the overall molecular weight of the polymer. The fast dry-through times for the coatings are due to the fast curing nature of the terminal alkoxysilane groups on the polymers. The terminal alkoxysilane groups are located near N-substituted urea linkages, and will react more rapidly with moisture than if non-N-substituted linkages were used, such as in the case of acrylic-silane polymers.

The gloss retention of the herein single-component coatings are improved by reducing the amount of moisture-curable alkoxysilane groups within the coating. Alkoxysilane groups within moisture-curable coatings are known to post-cure slowly for weeks, and even months, after the coatings have cured, and this is especially true in high humidity environments. As post-curing occurs over time, the gloss level of a moisture-curable coating can decrease, and may no longer provide the same appearance. This is especially important for military-specified coatings, such as the semi-gloss topside coatings used on Navy surface ships. Thus, by limiting the amount of terminal alkoxysilane groups on the N-substituted urea polymers, single-component coatings can be formulated where post-curing is minimized.

Adhesion of the single-component coatings of the present invention to epoxy primers can be improved by utilizing various N-substituted groups, such as ester-containing aliphatics, that provide hydrogen bonding with the underlying substrate.

In one embodiment of the present invention, a moisture-curable single-component coating comprises an N-substituted urea polymer with extended chains and terminal alkoxysilane groups, a catalyst and a solvent.

In a second embodiment, a moisture-curable single-component coating comprises an N-substituted urea polymer with extended chains and terminal alkoxysilane groups, a reactive diluent, a catalyst, a pigment, a filler, an additive, and a solvent.

In another embodiment, the N-substituted urea polymer with extended chains and terminal alkoxysilane groups comprises an aliphatic polyisocyanate, N-substituted amino-functional alkoxysilanes, and a secondary diamine chain extender.

In yet another embodiment, a method for producing a single-component coating composition comprises synthesizing an N-substituted urea polymer with extended chains and terminal alkoxysilane groups by first reacting an aliphatic polyisocyanate with an N-substituted amino-functional alkoxysilane, followed by reaction with a secondary diamine chain extender, such that no unreacted isocyanate remains, then mixing the synthesized polymer with a reactive diluent, a pigment, a filler, a solvent, a catalyst, an additive, or a combination thereof.

It is understood that both the foregoing general description and the following detailed description are exemplary and explanatory and are intended to provide further explanation of the invention as claimed. These and other features and advantages of the invention, as well as the invention itself, will become better understood by reference to the following detailed description, appended claims, and accompanying drawings, or may be learned by practice of the invention.

DETAILED DESCRIPTION OF THE INVENTION

Figure 1:
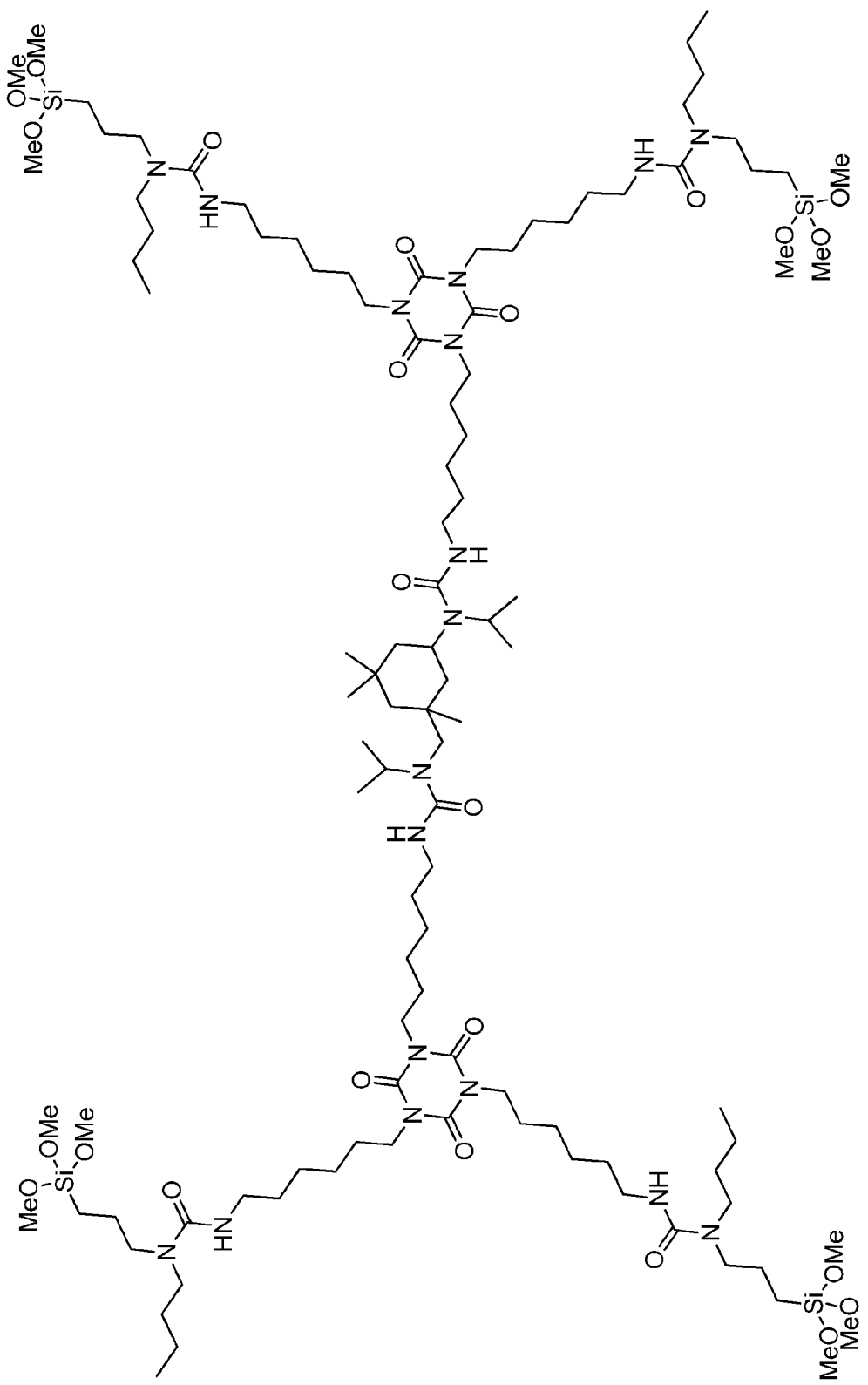
FIG. 1 is a structure of an N-substituted urea polymer with extended chains and terminal alkoxysilanes that is synthesized using an aliphatic polyisocyanate based on an HDI isocyanurate trimer, N-butyl-3-aminopropyltrimethoxysilane (an N-substituted amino-functional alkoxysilane), and N-isopropyl-3-((isopropylamino)methyl)-3,5,5-trimethylcyclohexan-1-amine (a cycloaliphatic secondary diamine chain extender).

References will now be made in detail to the preferred embodiments of the present invention, examples of which are illustrated in the accompanying figures.

A single-component coating means that all components are pre-mixed and does not require the addition of additives, a catalyst or reactive components before being applied to a substrate. The coating may need to be shaken or stirred before use, but the entire product is contained within a single can or container. A single-component coating is considered "user friendly" because it can be easily applied to a substrate, then restored simply by closing the container. Single-component coatings generate less waste than two-component coatings, because only the material removed from the can is utilized, unlike two-component coatings where the mixed materials will solidify and become waste if not utilized. The term "single-component" coating is often referred to as "1K", which is an abbreviation for 1 Komponent (the German spelling of component). However, "1K" is not intended to mean that the coating is made from a single chemical or substance, but rather that the end product does not need to be mixed with another component before application to a substrate.

An exemplary single-component coating composition of the present invention comprises an N-substituted urea polymer with extended chains and terminal alkoxysilanes, where the polymer is formed from an aliphatic polyisocyanate, N-substituted amino-functional alkoxysilanes, and a secondary diamine chain extender, such that no free isocyanate groups remain. The polymer has an N-substituted group at all urea linkages that are formed during the reaction process. The alkoxysilane groups are located at the terminus of the polymer, and the chain extenders are located internally. The single-component coating composition can also comprise a reactive diluent, a solvent, a catalyst, a pigment, a filler, an additive, or a mixture thereof.

The N-substituted urea polymer with extended chains and terminal alkoxysilanes is the reaction product of an aliphatic polyisocyanate, N-substituted amino-functional alkoxysilanes, and a secondary diamine chain extender. The aliphatic isocyanate should have at least 2 isocyanate (NCO) reactive groups per molecule. The aliphatic isocyanate is first reacted with an N-substituted amino-functional alkoxysilane to generate N-substituted urea linkages and terminal alkoxysilane groups. The secondary diamine chain extender is then reacted with the remaining isocyanate groups. Reaction of the secondary diamine chain extender with the isocyanate groups generates N-substitute urea linkages, while also increasing the size of the resulting polymer and forming dimers, trimers, tetramers, etc. The polymer should contain no unreacted isocyanate groups once the reaction is finished. The polymer can be synthesized in a solvent or combination of solvents.

In an exemplary embodiment, the aforementioned polymer is formed by reacting 30-95% of the isocyanate groups on the aliphatic polyisocyanate with an N-substituted amino-functional alkoxysilane, and 5-70% of the isocyanate groups on the aliphatic polyisocyanate with a secondary diamine chain extender, such that no unreacted isocyanate remains in the polymer. Addition of the chain extender forms larger molecules (e.g, dimers, trimers), which increases the overall molecular weight of the polymer.

The aliphatic polyisocyanate can be aliphatic or cycloaliphatic. Aliphatic polyisocyanates are more weatherable (exterior durable) than aromatic polyisocyanates, thereby providing greater color stability when utilized for exterior coatings. Aliphatic polyisocyanates can have various numbers of reactive isocyanate (NCO) groups per molecule, depending on their structure. Typically, the number ranges from 2.5 to 5.5. For the present invention, the aliphatic polyisocyanate should have greater than 2 NCO groups per molecule. Suitable aliphatic polyisocyanates include, but are not limited to, structures based on isocyanurates (e.g., HDI and IPDI trimers), biurets, uretdiones, allophanates, oxadiazinetriones, iminooxadiazinedione, and prepolymers containing urethanes. Mixtures of these isocyanates can also be used. There are many commercially available aliphatic polyisocyanates.

The N-substituted amino-functional alkoxysilane can be N-substituted 3-aminopropyltrialkoxysilane, N-substituted 3-aminopropylalkyldialkoxysilane or N-substituted dialkylalkoxysilane, where the alkyl group attached to the silicon atom can be methyl or ethyl, and the alkoxy group attached to the silicon atom can be methoxy, ethoxy, n-propoxy or n-butoxy.

The N-substituted group of the amino-functional alkoxysilane can be C1-C12 alkyl or cycloalkyl. Examples include, but are not limited to, N-methyl-3-aminopropyltrimethoxysilane, N-ethyl-3-aminopropyltriethoxysilane, N-methyl-3-aminopropyltributoxysilane, N-ethyl-3-aminopropyltripropoxysilane, N-iso-propyl-3-aminopropyltrimethoxysilane, N-tert-butyl-3-aminopropyltrimethoxysilane, N-butyl-3-aminopropyltrimethoxysilane, N-butyl-3-aminopropylmethyldimethoxysilane, N-butyl-3-aminopropyldimethylmethoxysilane, N-butyl-3-aminopropyltriethoxysilane, N-butyl-3-aminopropyltripropoxysilane, N-butyl-3-aminopropyltributoxysilane, N-iso-butyl-3-aminopropyltrimethoxysilane, N-cyclohexyl-3-aminopropyltrimethoxysilane, N-hexyl-3-aminopropyltrimethoxysilane, N-nonyl-3-aminopropytrimethoxysilane and N-dodecyl-3-aminopropyltrimethoxysilane. Many of these are commercially available.

The N-substituted group of the amino-functional alkoxysilane can also be an ester-containing aliphatic or ester-containing fluorinated aliphatic, which are formed by the Michael Addition (conjugate addition) reaction between a molecule with a reactive "ene" group, such as an acrylate, and 3-aminopropyltrialkoxysilane, 3-aminopropylalkyldialkoxysilane or 3-aminopropyldialkylalkoxysilane. Conditions for forming Michael Addition adducts with an amine are well known in the literature. Suitable acrylates include, but are not limited to, methyl acrylate, ethyl acrylate, butyl acrylate, cyclohexyl acrylate, hexyl acrylate, 2-ethylhexyl acrylate, octyl acrylate, 4-tert-butylcyclohexyl acrylate, diethyl maleate, dimethyl maleate, dibutyl maleate, ethylene glycol methyl ether acrylate, 1,1,1,3,3,3-hexafluoroisopropyl acrylate, 2,2,2-trifluoroethyl acrylate and 3,3,4,4,5,5,6,6,7,7,8,8,8-tridecafluorooctyl acrylate. Examples include, but are not limited to, methyl 3-((3-(trimethoxysilyl)propyl)amino)propanoate, butyl 3-((3-(trimethoxysilyl)propyl)amino)propanoate, 2-ethylhexyl 3-((3-(trimethoxysilyl)propyl)amino)propanoate, octyl 3-((3-(trimethoxysilyl)propyl)amino)propanoate, 3,3,3-trifluoropropyl 3-((3-(trimethoxysilyl)propyl)amino)propanoate, dimethyl (3-(trimethoxysilyl)propyl)aspartate and diethyl (3-(trimethoxysilyl)propyl)aspartate.

The N-substituted group of the amino-functional alkoxysilane can also be an amide-containing aliphatic, which is formed by the Michael Addition (conjugate addition) reaction between a molecule with a reactive "ene" group, such as an acrylamide, and 3-aminopropyltrialkoxysilane, 3-aminopropylalkyldialkoxysilane or 3-aminopropyldialkylalkoxysilane. Suitable acrylamides include, but are not limited to, N-ethylacrylamide, N-propylacrylamide, N-tert-butylacrylamide, N-cyclohexylacrylamide, N-ethyl maleimide and N,N'-diethylmaleamide. Examples include, but are not limited to, N-propyl-3-((3-(trimethoxysilyl)propyl)amino)propanamide, N-butyl-3-((3-(trimethoxysilyl)propyl)amino)propanamide, N-cyclohexyl-3-((3-(trimethoxysilyl)propyl)amino)propanamide and 1-ethyl-3-((3-(trimethoxysilyl)propyl)amino)pyrrolidine-2,5-dione.

The secondary diamine chain extender is a molecule that contains two reactive secondary amine groups, or N-substituted groups, with a chain of atoms between. These secondary diamine chain extenders are used for reacting with the isocyanate groups, extending the chain length between the terminal alkoxysilanes, and increasing the overall molecular weight of the N-substituted urea polymer. The secondary diamines form N-substituted urea linkages once reacted with the isocyanate groups. The secondary diamine chain extenders provide increased flexibility, exterior durability, and faster tack-free times for the N-substituted urea polymer and subsequent single-component coating. A mixture of secondary diamine chain extenders can be used to provide tailored flexibility and hardness. The secondary diamine chain extender can be an aliphatic or cycloaliphatic chain with secondary diamines, such as a bis(secondary diamine). The secondary diamine chain extender can also be, but is not limited to, a dimethylpolysiloxane chain with secondary diamines, a methylphenylpolysiloxane chain with secondary diamines, a polyether chain with secondary diamines, a polysulfide chain with secondary diamines, or a mixture thereof.

The N-substituted groups of the secondary diamines can be C1-C12 alkyl, cycloalkyl or ester-containing aliphatic. The N-substituted groups can be produced by reacting an amine with an aldehyde or ketone (e.g., acetone, methylethylketone) then reducing (hydrogenating). The N-substituted groups can also be produced by reacting an amine with a molecule containing a reactive "ene" group, such as an acrylate or maleate, via a Michael Addition (conjugate addition) reaction. Suitable secondary diamine chain extenders include, but are not limited to, the following:

| Structure | Name |
|---|---|
|  | $N^1,N^3$-dimethylpropane-1,3-diamine |
|  | $N^1,N^3$-diethylpropane-1,3-diamine |

-continued

| Structure | Name |
|---|---|
| | N$^1$,N$^5$-diisopropyl-2-methylpentane-1,5-diamine |
| | N$^1$,N$^6$-dimethylhexane-1,6-diamine |
| | N$^1$,N$^6$-bis(3,3-dimethylbutan-2-yl)hexane-1,6-diamine |
| | N,3,3,5-tetramethyl-5-((methylamino)methyl)cyclohexan-1-amine |
| | N-isopropyl-3-((isopropylamino)methyl)-3,5,5-trimethylcyclohexan-1-amine |
| | tetraethyl 2,2'-((2-methylpentane-1,5-diyl)bis(azanediyl))disuccinate |
| | 4,4'-methylenebis(N-isopropylcyclohexan-1-amine) |
| | tetraethyl 2,2'-((methylenebis(cyclohexane-4,1-diyl))bis(azanediyl))disuccinate |
| | 4,4'-methylenebis(N-(sec-butyl)cyclohexan-1-amine) |

| Structure | Name |
|---|---|
| BuO-C(=O)-CH2CH2-NH-(CH2)6-NH-CH2CH2-C(=O)-OBu | dibutyl 3,3'-(hexane-1,6-diylbis(azanediyl))dipropionate |
| MeHN-(CH2)3-Si(Me)2-O-Si(Me)2-(CH2)3-NHMe | 3,3'-(1,1,3,3-tetramethyldisiloxane-1,3-diyl)bis(N-methylpropan-1-amine) |
| iPrNH-(CH2)3-Si(Me)2-O-[Si(Me)2-O]n-Si(Me)2-(CH2)3-NHiPr | N,N'-isopropylaminopropyl terminated polydimethylsiloxane |
| EtNH-CH2CH(Me)-Si(Me)2-O-[Si(Me)2-O]n-Si(Me)2-CH2CH(Me)-NHEt | N,N'-ethylaminoisobutyl terminated polydimethylsiloxane |

Several secondary diamine chain extenders are commercially available.

A person skilled in the art understands that secondary triamines, secondary tetramines, secondary pentaamines, or larger, could also be utilized as the chain extender, although the viscosity of the resulting N-substituted urea polymer would be greater than if using a similar secondary diamine.

The N-substituted urea polymer with extended chains and terminal alkoxysilanes is the reaction product of an aliphatic polyisocyanate, an N-substituted amino-functional alkoxysilane, and a secondary diamine chain extender. As discussed above, numerous aliphatic polyisocyanates, secondary diamine chain extenders and N-substituted amino-functional alkoxysilanes can be utilized, thus providing the ability to generate a large variety of polymers that possess differences in molecular weight, structure and properties (e.g., cure times, hardness, flexibility, solvent resistance and exterior weathering resistance). In an example synthesis of the N-substituted urea polymer with extended chains and terminal alkoxysilanes, the polymer is the reaction product of (i) an aliphatic polyisocyanate with at least 2 isocyanate (NCO) reactive groups per molecule, where (ii) 30-95% of the isocyanate groups are reacted with an N-substituted amino-functional alkoxysilane, and (iii) 5-70% of the isocyanate groups are reacted with a secondary diamine chain extender, such that no unreacted isocycanate remains in said polymer. Preferably, the N-substituted urea polymer with extended chains and terminal alkoxysilanes is the reaction product of (i) an aliphatic polyisocyanate with at least 2 isocyanate (NCO) reactive groups per molecule, where (ii) 50-80% of the isocyanate groups are reacted with an N-substituted amino-functional alkoxysilane, and (iii) 20-50% of the isocyanate groups are reacted with a secondary diamine chain extender, such that no unreacted isocycanate remains in said polymer. More preferably, the N-substituted urea polymer with extended chains and terminal alkoxysilanes is the reaction product of (i) an aliphatic polyisocyanate with at least 2 isocyanate (NCO) reactive groups per molecule, where (ii) 60-70% of the isocyanate groups are reacted with an N-substituted amino-functional alkoxysilane, and (iii) 30-40% of the isocyanate groups are reacted with a secondary diamine chain extender, such that no unreacted isocycanate remains in said polymer.

A person skilled in the art understands that a small amount of isocyanate groups (e.g., 1-5%) could remain unreacted in the polymer, and thereby could be used to assist with adhesion to a substrate, or could be used to react with an isocyanate-reactive material that is not discussed in this invention. However, reacting a small percentage of the isocyanate groups on a polymer with a non-disclosed material is not expected to change the properties of the polymer, and should not be considered a separate invention. For the purpose of making isocyanate-free coatings, it is recommended that all isocyanate groups be reacted during synthesis of the N-substituted urea polymer.

The structure in FIG. 1 is an example of an N-substituted urea polymer with extended chains and terminal alkoxysilanes that is synthesized using an aliphatic polyisocyanate based on an HDI isocyanurate trimer, N-butyl-3-aminopropyltrimethoxysilane (an N-substituted amino-functional alkoxysilane), and N-isopropyl-3-((isopropylamino)methyl)-3,5,5-trimethylcyclohexan-1-amine (a cycloaliphatic secondary diamine chain extender). In this example, all newly formed N-substituted urea groups possess either a butyl or isopropyl group.

Alternative structures of N-substituted urea polymers with extended chains and terminal alkoxysilanes can be formed by varying the type of aliphatic polyisocyanate, N-substituted amino-functional alkoxysilane, or the secondary diamine chain extender utilized in the synthetic process.

Figure 2:
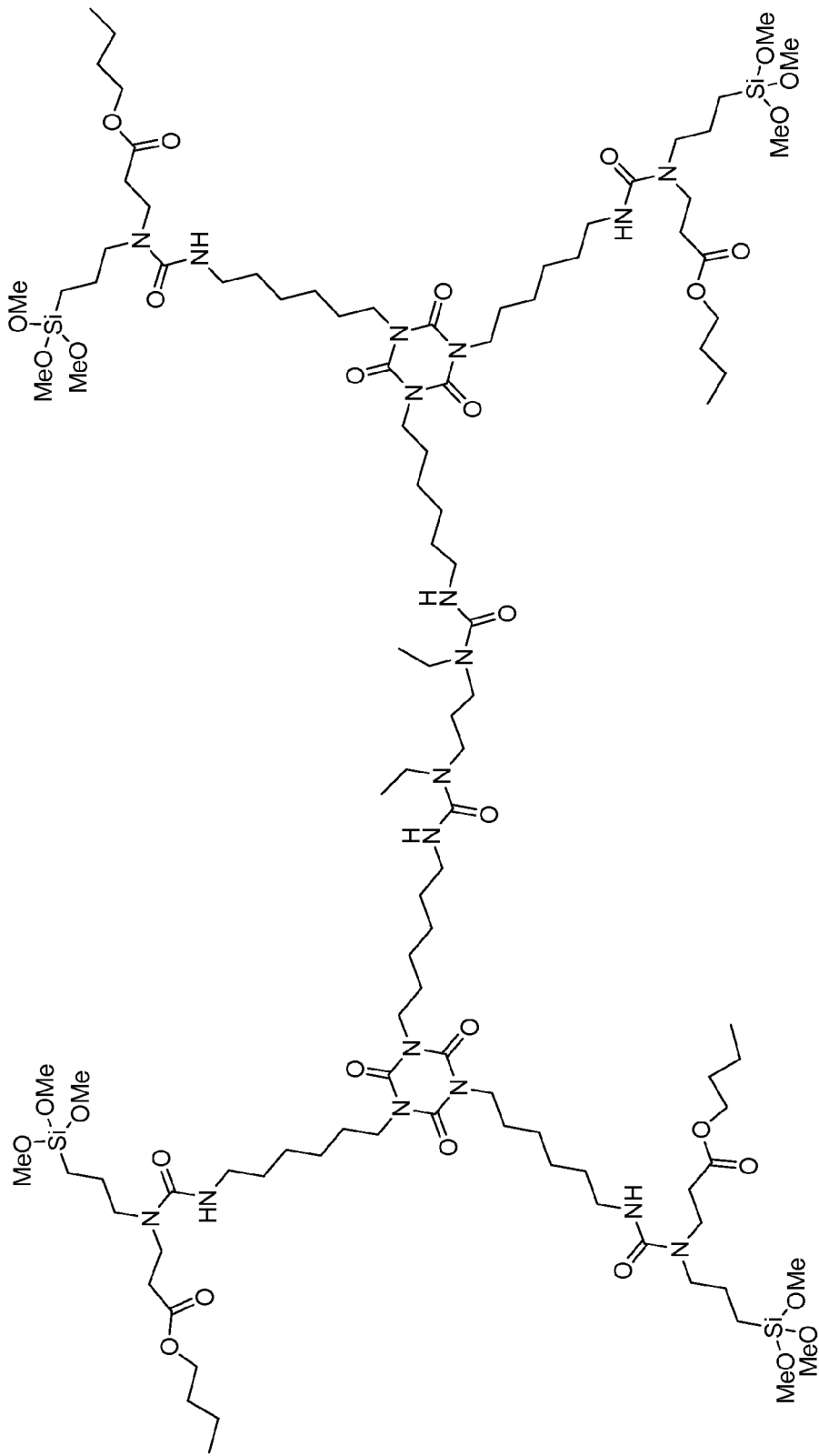
FIG. 2 is a structure of an N-substituted urea polymer with extended chains and terminal alkoxysilanes that is synthesized using an aliphatic polyisocyanate based on an HDI isocyanurate trimer, a Michael Addition adduct of butyl acrylate and 3-aminopropyltrimethoxysilane (an N-substituted amino-functional alkoxysilane), and $N^1,N^3$-diethyl-propane-1,3-diamine (an aliphatic secondary diamine chain extender).

The structure in FIG. 2 is an example of an N-substituted urea polymer with extended chains and terminal alkoxysilanes that is synthesized using an aliphatic polyisocyanate based on an HDI isocyanurate trimer, a Michael Addition adduct of butyl acrylate and 3-aminopropyltrimethoxysilane (an N-substituted amino-functional alkoxysilane), and $N^1,N^3$-diethylpropane-1,3-diamine (an aliphatic secondary diamine chain extender). This polymer demonstrated improved adhesion to certain epoxy primers due to the increased hydrogen bonding that the butyl-ester groups provide.

Alternative structures of N-substituted urea polymers with extended chains and terminal alkoxysilanes can be formed by utilizing a mixture of two different aliphatic isocyanates, an N-substituted amino-functional alkoxysilane, and a secondary diamine chain extender.

Figure 3:
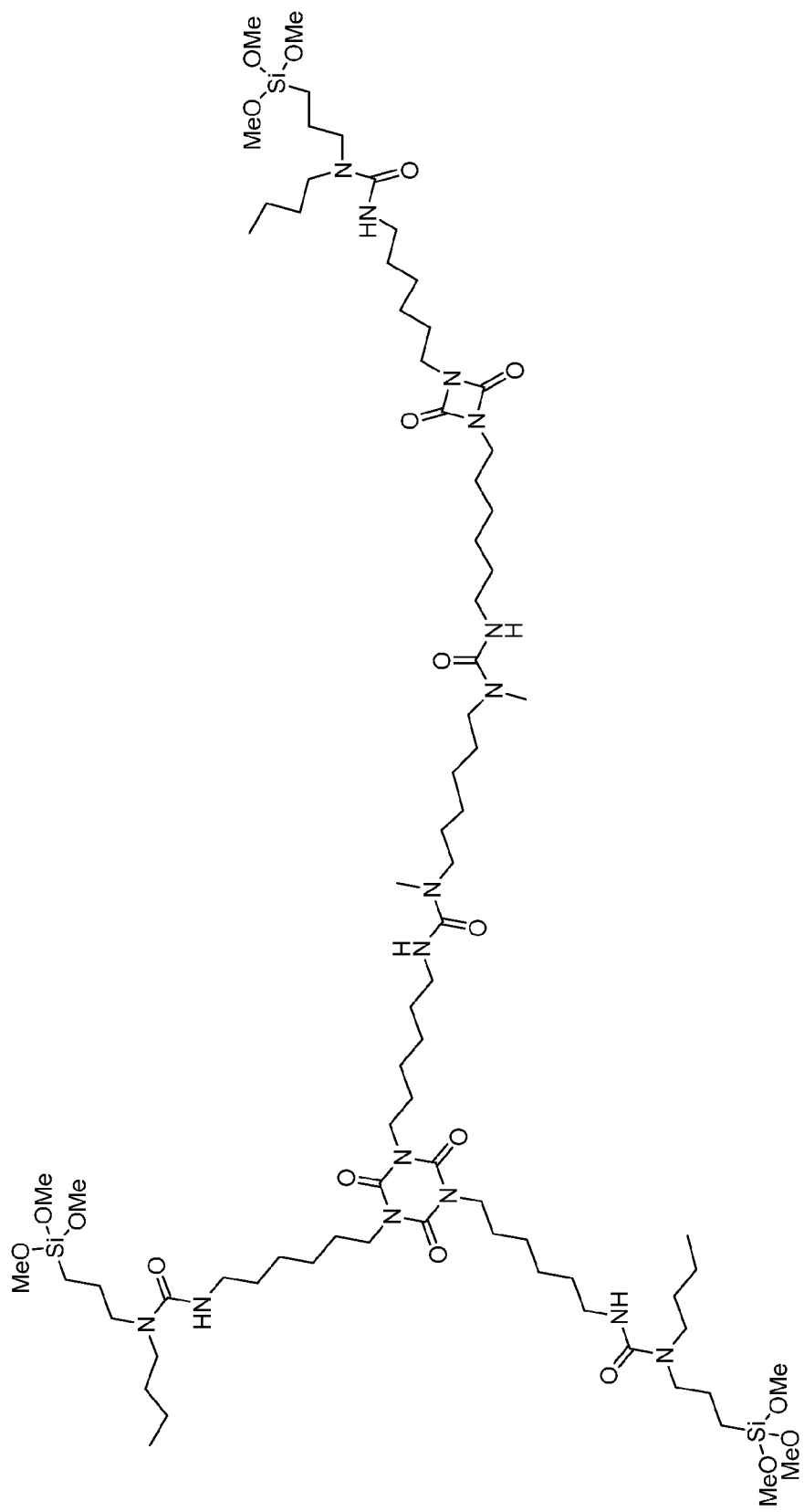
FIG. 3 is a structure of an N-substituted urea polymer with extended chains and terminal alkoxysilanes that is synthesized using a 1:1 mixture of an aliphatic polyisocyanate based on an HDI isocyanurate trimer and an aliphatic polyisocyanate based on a uretdione, N-butyl-3-aminopropyltrimethoxysilane (an N-substituted amino-functional alkoxysilane), and $N^1,N^6$-dimethylhexane-1,6-diamine (an aliphatic secondary diamine chain extender).

The structure in FIG. 3 is an example of an N-substituted urea polymer with extended chains and terminal alkoxysilanes that is synthesized using a 1:1 mixture of an aliphatic polyisocyanate based on an HDI isocyanurate trimer and an aliphatic polyisocyanate based on a uretdione, N-butyl-3-aminopropyltrimethoxysilane (an N-substituted amino-functional alkoxysilane), and $N^1,N^6$-dimethylhexane-1,6-diamine (an aliphatic secondary diamine chain extender). The N-substituted amino-functional alkoxysilane is reacted with ~60% of the isocyanate groups, whereas the secondary diamine chain extender is reacted with ~40% of the isocyanate groups. The structure is asymmetric due to the use of two different aliphatic polyisocyanates.

Figure 4:
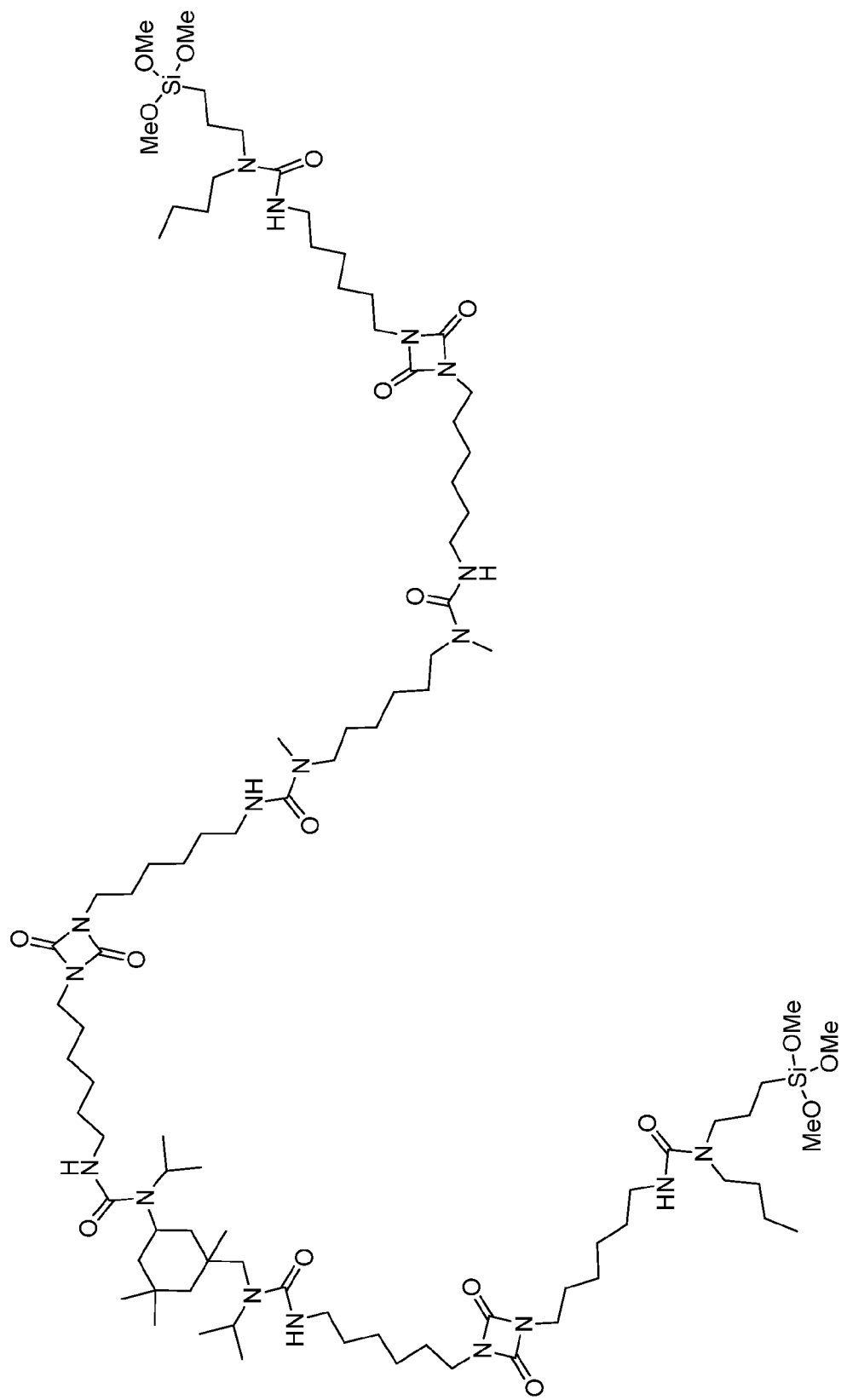
FIG. 4 is a structure of an N-substituted urea polymer with extended chains and terminal alkoxysilanes that is synthesized using an aliphatic polyisocyanate based on a uretdione, N-butyl-3-aminopropyltrimethoxysilane (an N-substituted amino-functional alkoxysilane), and a 1:1 mixture of $N^1,N^6$-dimethylhexane-1,6-diamine (an aliphatic secondary diamine chain extender) and N-isopropyl-3-((isopropylamino)methyl)-3,5,5-trimethylcyclohexan-1-amine (a cycloaliphatic secondary diamine chain extender).

The structure in FIG. 4 is an example of an N-substituted urea polymer with extended chains and terminal alkoxysilanes that is synthesized using an aliphatic polyisocyanate based on a uretdione, N-butyl-3-aminopropyltrimethoxysilane (an N-substituted amino-functional alkoxysilane), and a 1:1 mixture of $N^1,N^6$-dimethylhexane-1,6-diamine (an aliphatic secondary diamine chain extender) and N-isopropyl-3-((isopropylamino)methyl)-3,5,5-trimethylcyclohexan-1-amine (a cycloaliphatic secondary diamine chain extender). The N-substituted amino-functional alkoxysilane is reacted with ~50% of the isocyanate groups, whereas the secondary diamine chain extenders are reacted with ~50% of the isocyanate groups. The structure is asymmetric due to the use of two different secondary diamine chain extenders. The reason for the use of two different chain extenders is to provide tailored properties of both hardness and flexibility.

Properties of the synthesized polymers were evaluated by applying the polymer solutions to tinplate panels or Laneta cards at 2 to 6 mils (50.8 to 152.4 microns) wet film thickness. The resulting dry film thickness of each film (a clear coating) depended on the percentage volume solids of the polymer solution. In general, and without using a catalyst, the N-substituted urea polymers with extended chains and terminal alkoxysilanes have tack-free times of only a few hours. This is due to the polymers having glass transition temperatures near or above room temperature. After 7 days of curing at ambient conditions, the clear coatings demonstrate a resistance of 50-100 double rubs to methyl ethyl ketone (MEK) solvent. Furthermore, when tested for flexibility, the clear coatings pass a 180 degree bend test and a ¼" Mandrel Bend test without cracking. The coatings could also be straightened and bent numerous times without damage. Addition of only 1 weight % of a catalyst, based on polymer solids, provided clear coatings with dry-through times of 3-6 hours and a solvent resistance of >100 MEK double rubs. The flexibility was unaffected by addition of a catalyst.

The N-substituted urea polymers with extended chains and terminal alkoxysilanes are used to formulate both clear and pigmented single-component coatings. The single-component coatings can also comprise a reactive diluent, a filler, a pigment, a solvent, an additive, a catalyst, or a mixture thereof.

A reactive diluent may be used for modifying the properties of the single-component coating, such as increasing the flexibility or hardness, reducing solvent content and viscosity, or increasing resistance to exterior degradation from sunlight. The reactive diluent can be a polysiloxane with at least 2 hydrolyzable alkoxysilane groups, such as, but not limited to, poly(dimethoxysiloxane), poly(diethoxysiloxane), methoxy-functional dimethylpolysiloxane, methoxy-functional methylphenylpolysiloxane, ethoxy-functional dimethylpolysiloxane, and structures based on tetraethyl orthosilicate. The reactive diluent can also be hydroxyl-functional versions (via hydrolysis) of these polysiloxanes. Many of these are commercially available.

The reactive diluent can also be an alkyl-functional alkoxysilane, where the alkyl group is C1-C16 alkyl, cycloalkyl or fluorinated alkyl, and the alkoxysilane group is trimethoxysilane, triethoxysilane, methyldimethoxysilane, methyldiethoxysilane, dimethylmethoxysilane and dimethylethoxysilane. Examples include, but are not limited to, propyltrimethoxysilane, hexyltrimethoxysilane, octyltrimethoxysilane, octyltriethoxysilane, hexadecyltrimethoxysilane, cyclohexyltriethoxysilane and 1H,1H,2H,2H-perfluorooctyltriethoxysilane.

The reactive diluent can also be a polysiloxane-urea polymer with hydrolysable alkoxysilane groups. These reactive diluents are formed by reacting a polysiloxane with primary diamines or a polysiloxane with secondary diamines with 3-isocyanatopropyltrimethoxysilane or 3-isocyanatotriethoxysilane. They can also be formed by reacting a diisocyanate-functional polysiloxane with an N-substituted 3-aminopropylalkoxysilane. The polysiloxane can be a dimethylpolysiloxane or methylphenylpolysiloxane. The N-substituted groups of the secondary diamines (attached to the polysiloxane) and N-substituted 3-aminopropylalkoxysilane can be C1-C12 alkyl, cycloalkyl or ester-containing aliphatic. The alkoxysilane group of the N-substituted 3-aminopropylalkoxysilane can be trimethoxysilane, triethoxysilane, methyldimethoxysilane, methyldiethoxysilane, dimethylmethoxysilane and dimethylethoxysilane. There are several commercial sources of the raw materials for synthesizing these reactive diluents. Example structures of these synthesized reactive diluents include, but are not limited to, the following:

| Structure | Name |
|---|---|
| (EtO)₃Si~~~N(H)C(O)N(Et)~~~CH(CH₃)~~~Si(Me)₂-O-[Si(Me)₂-O]ₙ-Si(Me)₂~~~CH(CH₃)~~~N(Et)C(O)N(H)~~~Si(OEt)₃ | Bis((3-triethoxysilyl)propyl)urea adduct based on N,N'-ethylaminoisobutyl terminated polydimethylsiloxane |
| (EtO)₃Si~~~N(H)C(O)N(H)~~~Si(Me)₂-O-[Si(Me)₂-O]ₙ-Si(Me)₂~~~N(H)C(O)N(H)~~~Si(OEt)₃ | Bis((3-triethoxysilyl)propyl)urea adduct based on aminopropyl terminated polydimethylsiloxane |
| (MeO)₃Si~~~N(Bu)C(O)N(H)-Cy-CH₂-Cy-N(H)C(O)-O~~~Si(Me)₂-O-[Si(Me)₂-O]ₙ-Si(Me)₂~~~O-C(O)N(H)-Cy-CH₂-Cy-N(H)C(O)N(Bu)~~~Si(OMe)₃ | Bis(N-substituted 3-aminopropylalkoxysilane) urea adduct based on diisocyanate-functional polydimethylsiloxane |

Reactive diluents that contain N-substituted urea groups are used due to their reduced hydrogen bonding character, lower viscosity and reduced solvent requirements.

The reactive diluent can also be an aliphatic or cycloaliphatic N-substituted urea with hydrolysable alkoxysilane groups. These reactive diluents are formed by reacting an aliphatic or cycloaliphatic secondary diamine chain extender with 3-isocyanatopropyltrimethoxysilane or 3-isocyanatotriethoxysilane. The 3-isocyanatopropyltrimethoxysilane and 3-isocyanatotriethoxysilane are commercially available. Suitable secondary diamine chain extenders are the same as those utilized for synthesizing the N-substituted urea polymer with extended chains and terminal alkoxysilanes. Example structures of these synthesized reactive diluents include, but are not limited to, the following:

| Structure | Name |
|---|---|
| 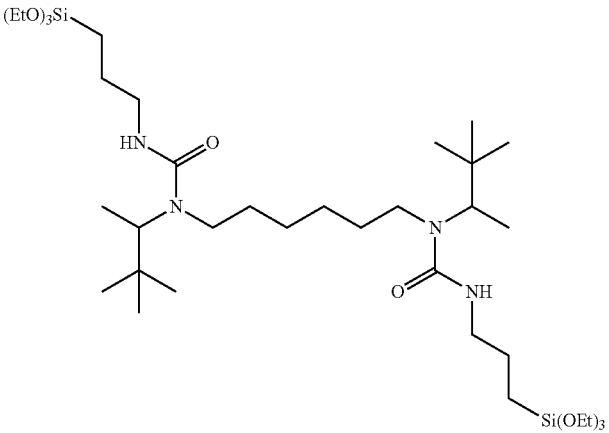 | 1,1'-(hexane-1,6-diyl)bis(1-(3,3-dimethylbutan-2-yl)-3-(3-(triethoxysilyl)propyl)urea) |
| 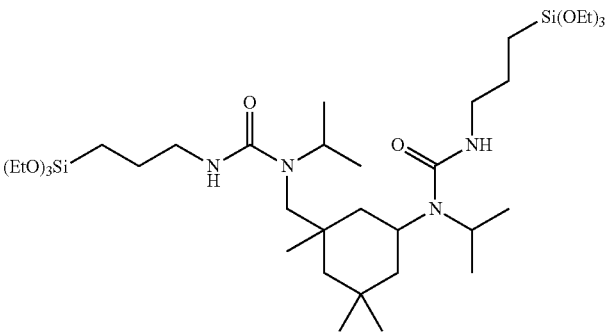 | 1-isopropyl-1-((5-(1-isopropyl-3-(3-(triethoxysilyl)propyl)ureido)-1,3,3-trimethylcyclohexyl)methyl)-3-(3-(triethoxysilyl)propyl)urea |
| 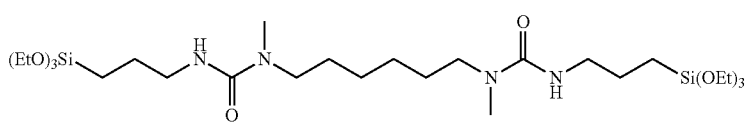 | 1,1'-(hexane-1,6-diyl)bis(1-methyl-3-(3-(triethoxysilyl)propyl)urea) |
| 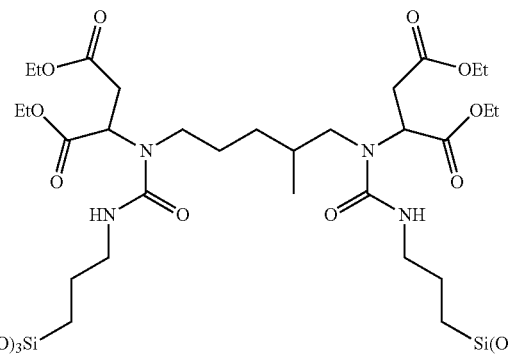 | tetraethyl 2,2'-4,4,22,22-tetraethoxy-12-methyl-9,17-dioxo-3,23-dioxa-8,10,16,18-tetraaza-4,22-disilapentacosane-10,16-diyl)disuccinate |

The reactive diluent can also be a polyester-urethane polymer with hydrolyzable alkoxysilane groups. These reactive diluents are formed by reacting an aliphatic or cycloaliphatic polyester polyol with 3-isocyanatopropyltrimethoxysilane or 3-isocyanatotriethoxysilane. The polyester polyol should be linear or slightly branched, and is utilized to provide increased flexibility for the single-component coating. Suitable polyester polyols are commercially available. The 3-isocyanatopropyltrimethoxysilane and 3-isocyanatotriethoxysilane are also commercially available.

Suitable solvents for synthesis of the N-substituted urea polymer with extended chains and terminal alkoxysilane groups are those that are not reactive with isocyanate groups. These solvents include, but are not limited to, xylenes, light aromatic naphtha, mineral spirits, butyl acetate, 1-methoxy-2-propyl acetate, tert-butyl acetate, butyl propionate, pentyl propionate, ethyl 3-ethoxypropionate, parachlorobenzotrifluoride, tetrahydrofuran, 1,4-dioxane, dimethylacetamide and N-methyl pyrrolidone. These solvents can also be utilized in single-component coating compositions.

A catalyst is used to accelerate the rate of hydrolysis of the terminal alkoxysilane groups on the N-substituted urea polymer with extended chains, and to facilitate crosslinking of the resulting silanol groups to form a cured coating. Suitable catalyst for the single-component coating composition include, but are not limited to, organic tin compounds, such as dibutyl tin dilaurate, dibutyl tin diacetate and dibutyl tin bis(2-ethylhexoate), metal alkoxides, such as titanium tetraisopropoxide, aluminum triethoxide and zirconium tetrabutoxide, alkalines, such as potassium hydroxide, organic acids, inorganic acids, tertiary amines, or mixtures thereof. A catalyst can be used in a clear or pigmented single-component coating.

Suitable pigments for the single-component coating composition include, but are not limited to, titanium dioxide, carbon black, red iron oxide, yellow iron oxide, copper phthalocyanine blue, sodium aluminum sulphosilicate, chromium oxide, cobalt chromite green spinel, chromium green-black hematite, nickel antimony titanium yellow rutile, and manganese-based pigments.

Suitable fillers for the single-component coating composition include, but are not limited to, amorphous silica, functionalized silica, talc, mica, wollastonite, calcium carbonate, glass beads, graphite, polymeric waxes, acrylic beads, polyurethane beads and ceramic microspheres.

Suitable additives for the single-component coating composition include, but are not limited to, rheology modifiers, thickening agents, adhesion promoters, reinforcing agents, wetting and dispersing agents, anti-floating agents, flame retardants, ultraviolet (UV) absorbers, hindered amine light stabilizers (HALS), and flow and leveling agents.

Depending on the level of catalyst and type of fillers, the single-component coating compositions have a pot-life of 6-12 months in a closed can and in the absence of moisture.

The single-component coating composition can be applied via spray, brush or roll application. The single-component coating can be applied at 1 to 12 mils (25.4 to 304.8 microns) wet film thickness, preferably 3 to 10 mils (76.2 to 254 microns) wet film thickness, and more preferably 4 to 6 mils (101.6 to 152.4 microns) wet film thickness. Viscosities are typically within the range of HVLP to pressure-pot sprayable, depending on the composition.

The single-component coating can be applied to a variety of substrates. Suitable substrates include, but are not limited to, epoxy primed surfaces, polyurethane primed surfaces, pretreatments, epoxy-based composites, weathered or abraded silicone alkyd coatings, weathered or abraded polysiloxane coatings, bare steel surfaces, bare aluminum surfaces, bare aluminum alloy surfaces, concrete, glass, ceramics and plastics.

EXAMPLES

The following examples describe the synthesis of N-substituted urea polymers with extended chains and terminal alkoxysilanes, in addition to single-component coating compositions that are based on the polymers. The examples are not to be considered as limiting the invention to their details.

Example 1

This example describes the preparation of a polymer based on an aliphatic polyisocyanate, N-alkyl amino-functional alkoxysilanes, and a cycloaliphatic secondary diamine chain extender with N-alkyl groups. The structure is shown in FIG. 1.

81.6 g (0.446 equiv.) of an aliphatic polyisocyanate based on an HDI isocyanurate trimer (commercially available as Desmodur N-3600 from Bayer Material Science) was dissolved in 115 g of Aromatic 100 (commercially available from Exxon) in a 500 ml 3-neck round bottom flask equipped with an Argon inlet and thermometer. This was followed by the addition of 5 g of vinyltrimethoxysilane (commercially available from Aldrich) as a drying agent. Using an addition funnel, 71.38 g (0.303 equiv.) of N-butyl-3-aminopropyltrimethoxysilane (commercially available as SIB 1932.2 from Gelest) was added dropwise to the solution while keeping the temperature at 40-50° C. Next, 18.78 g (0.147 equiv.) of N-isopropyl-3-((isopropylamino)methyl)-3,5,5-trimethylcyclohexanamine was added dropwise while continuing to keep the temperature at 40-50° C. After the addition was complete, the solution was stirred for an additional 15-30 minutes until the infrared (IR) spectra indicated that no more free isocyanate (NCO) (2270 $cm^{-1}$) remained in solution. The polymer solution was calculated to have a solids content of 60.6% by weight.

Example 2

A semi-gloss single-component coating composition was prepared by mixing 165.01 g of the polymer solution (100 g solid polymer by weight) in Example 1 with 11.65 g titanium dioxide, 2.9 g Shepherd Black 30C940, 1.95 g Shepherd Green 410, 1.0 g Shepherd Yellow 30C119, 20 g ceramic microspheres, 10 g Oxsol 100 and 0.5 g dibutyl tin dilaurate.

The coating was applied at 3 mils (76.2 microns) wet film thickness to tinplate panels and a laneta card, and was allowed to cure (crosslink) at ambient conditions (77° F. and 50% relative humidity). The coating demonstrated a tack-free time of 1 hour and a dry-hard time of 6 hours. After 14 days of curing at ambient conditions, the coating demonstrated a 60° gloss of 57 GU, a resistance of 100+ double rubs to methyl ethyl ketone (MEK) solvent, and a pendulum hardness of 84 oscillations. The coating also demonstrated high flexibility, and passed a 180 degree bend test and a ¼" Mandrel Bend test without cracking.

Example 3

A semi-gloss single-component coating composition was prepared by mixing 132.01 g of the polymer solution (80 g solid polymer by weight) in Example 1 with 11.65 g titanium dioxide, 2.9 g Shepherd Black 30C940, 1.95 g Shepherd Green 410, 1.0 g Shepherd Yellow 30C119, 30 g ceramic microspheres, 20 g of a methoxy-functional dimethylpolysiloxane (commercially available as Silres SY231 from Wacker Chemical), 15 g Oxsol 100 and 1.0 g dibutyl tin dilaurate.

The coating was applied at 3 mils (76.2 microns) wet film thickness to tinplate panels and a laneta card, and was allowed to cure (crosslink) at ambient conditions (77° F. and 50% relative humidity). The coating demonstrated a tack-free time of 1 hour and a dry-hard time of 3 hours. After 14 days of curing at ambient conditions, the coating demonstrated a 60° gloss of 48 GU, a resistance of 100+ double rubs to methyl ethyl ketone (MEK) solvent, and a pendulum hardness of 91 oscillations. The coating also demonstrated high flexibility, and passed a 180 degree bend test and a ¼" Mandrel Bend test without cracking. Xenon Arc Weatherometer (WOM) testing of the coating demonstrated a color change (Delta E) of <0.5 after 2000 hours exposure.

Example 4

This example describes the preparation of a polymer based on an aliphatic polyisocyanate, N-substituted amino-functional alkoxysilanes with butyl ester-containing groups, and an aliphatic secondary diamine chain extender with N-alkyl groups. The structure is shown in FIG. 2.

35.5 g (0.194 equiv.) of an aliphatic polyisocyanate based on an HDI isocyanurate trimer (commercially available as Desmodur N-3600 from Bayer Material Science) was dissolved in 60 g of Aromatic 100 solvent (commercially available from Exxon) in a 500 ml 3-neck round bottom flask equipped with an Argon inlet and thermometer. This was followed by the addition of 2 g of vinyltrimethoxysilane (commercially available from Aldrich) as a drying agent. Using an addition funnel, 40 g (0.130 equiv.) of butyl 3-((3-(trimethoxysilyl)propyl)amino)propanoate (synthesized by reacting 3-aminopropyltrimethoxysilane with butyl acrylate via a Michael Addition reaction) was added dropwise to the solution while keeping the temperature at 40-50° C. Next, 4.17 g (0.064 equiv.) of $N^1,N^3$-diethylpropane-1,3-diamine was added dropwise while continuing to keep the temperature at 40-50° C. After the addition was complete, the solution was stirred for an additional 15-30 minutes until the infrared (IR) spectra indicated that no more free isocyanate (NCO) (2270 $cm^{-1}$) remained in solution. The polymer solution was calculated to have a solids content of 57.6% by weight.

Example 5

This example describes the preparation of a polymer based on an aliphatic polyisocyanate, N-alkyl amino-functional alkoxysilanes, and a cycloaliphatic secondary diamine chain extender with N-alkyl groups, although with different ratios than utilized in Example 1.

81.6 g (0.446 equiv.) of an aliphatic polyisocyanate based on an HDI isocyanurate trimer (commercially available as Desmodur N-3600 from Bayer Material Science) was dissolved in 115 g of xylenes (commercially available from Aldrich) in a 500 ml 3-neck round bottom flask equipped with an Argon inlet and thermometer. This was followed by the addition of 5 g of vinyltrimethoxysilane (commercially available from Aldrich) as a drying agent. Using an addition funnel, 84.03 g (0.357 equiv.) of N-butyl-3-aminopropyltrimethoxysilane (commercially available as SIB 1932.2 from Gelest) was added dropwise to the solution while keeping the temperature at 40-50° C. Next, 12.57 g (0.0979 equiv.) of N-isopropyl-3-((isopropylamino)methyl)-3,5,5-trimethylcyclohexanamine was added dropwise while continuing to keep the temperature at 40-50° C. After the addition was complete, the solution was stirred for an additional 15-30 minutes until the infrared (IR) spectra indicated that no more free isocyanate (NCO) (2270 $cm^{-1}$) remained in solution. The polymer solution was calculated to have a solids content of 61.4% by weight.

Example 6

A semi-gloss single-component coating composition was prepared by mixing 130.29 g of the polymer solution (80 g solid polymer by weight) in Example 5 with 11.65 g titanium dioxide, 2.9 g Shepherd Black 30C940, 1.95 g Shepherd Green 410, 1.0 g Shepherd Yellow 30C119, 30 g ceramic microspheres, 20 g of a methoxy-functional dimethylpolysiloxane (commercially available as Silres SY231 from Wacker Chemical), 5 g Oxsol 100 and 1.0 g dibutyl tin dilaurate.

The coating was applied at 3 mils (76.2 microns) wet film thickness to tinplate panels and a laneta card, and was allowed to cure (crosslink) at ambient conditions (77° F. and 50% relative humidity). The coating demonstrated a tack-free time of 3 hours and a dry-hard time of 6 hours. After 14 days of curing at ambient conditions, the coating demonstrated a 60° gloss of 48 GU, a resistance of 100+ double rubs to methyl ethyl ketone (MEK) solvent, and a pendulum hardness of 82 oscillations. The coating also demonstrated high flexibility, and passed a 180 degree bend test and a ¼" Mandrel Bend test without cracking. Xenon Arc Weatherometer (WOM) testing of the coating demonstrated a color change (Delta E) of <0.80 after 2000 hours exposure.

Example 7

A low-gloss single-component coating composition was prepared by mixing 130.29 g of the polymer solution (80 g solid polymer by weight) in Example 5 with 15 g titanium dioxide, 0.2 g carbon black, 25 g amorphous silica, 20 g of a methoxy-functional dimethylpolysiloxane (commercially available as Silres SY231 from Wacker Chemical), 30 g xylenes and 1.0 g dibutyl tin dilaurate.

The coating was applied at 3 mils (76.2 microns) wet film thickness to tinplate panels and a laneta card, and was allowed to cure (crosslink) at ambient conditions (77° F. and 50% relative humidity). The coating demonstrated a tack-free time of 3 hours and a dry-hard time of 6 hours. After 14 days of curing at ambient conditions, the coating demonstrated a 60° gloss of 0.9 GU, a 85° gloss of 2.3 GU, a resistance of 100+ double rubs to methyl ethyl ketone (MEK) solvent, and a pendulum hardness of 56 oscillations. The coating also demonstrated high flexibility, and passed a 1" Mandrel Bend test without cracking.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A single-component coating composition, comprising an N-substituted urea polymer with extended chains and terminal alkoxysilanes, wherein said polymer is a reaction product of an aliphatic polyisocyanate, an N-substituted amino-functional alkoxysilane, and a secondary diamine chain extender, wherein the secondary diamine chain extender comprises N-substituted groups that are ester-containing aliphatic, wherein no unreacted isocyanate remains in said polymer.

2. The composition of claim 1, additionally comprising a catalyst, a reactive diluent, a pigment, a filler, a solvent, an additive, or any combination thereof.

3. The composition of claim 1, wherein the N-substituted urea polymer with extended chains and terminal alkoxysilanes is a reaction product of:
  an aliphatic polyisocyanate with at least 2 isocyanate reactive groups per molecule;
  an N-substituted amino-functional alkoxysilane, wherein 30 to 95% of the isocyanate groups are reacted with said N-substituted amino-functional alkoxysilane; and
  a secondary diamine chain extender, wherein 5 to 70% of the isocyanate groups are reacted with said secondary diamine chain extender.

4. The composition of claim 1, wherein the N-substituted urea polymer with extended chains and terminal alkoxysilanes is a reaction product of:
  an aliphatic polyisocyanate with at least 2 isocyanate reactive groups per molecule;
  an N-substituted amino-functional alkoxysilane, wherein 50 to 80%, and preferably 60 to 70%, of the isocyanate groups are reacted with said N-substituted amino-functional alkoxysilane; and
  a secondary diamine chain extender, wherein 20 to 50%, and preferably 30 to 40%, of the isocyanate groups are reacted with said secondary diamine chain extender.

5. The composition of claim 1, wherein the aliphatic polyisocyanate is aliphatic or cycloaliphatic and comprises isocyanurates, biurets, uretdiones, allophanates, oxadiazinetrione, iminooxadiazinediones, or any combination thereof.

6. The composition of claim 1, wherein the N-substituted amino-functional alkoxysilane comprises N-substituted 3-aminopropyltrialkoxysilane, N-substituted 3-aminopropylalkyldialkoxysilane, N-substituted 3-aminopropyldialkylalkoxysilane, or any combination thereof.

7. The composition of claim 1, wherein the N-substituted amino-functional alkoxysilane comprises N-substituted groups that are C1-C12 alkyl, cycloalkyl, ester-containing aliphatic, ester-containing fluorinated aliphatic, amide-containing aliphatic, or any combination thereof.

8. The composition of claim 1, wherein the N-substituted amino-functional alkoxysilane comprises N-methyl-3-aminopropyltrimethoxysilane, N-butyl-3-aminopropyltrimethoxysilane, N-butyl-3-aminopropylmethyldimethoxysilane, N-butyl-3-aminopropyltriethoxysilane, N-cyclohexyl-3-aminopropyltrimethoxysilane, butyl 3-((3-(trimethoxysilyl)propyl)amino)propanoate, 2-ethylhexyl 3-((3-(trimethoxysilyl)propyl)amino)propanoate, 3,3,3-trifluoropropyl 3-((3-(trimethoxysilyl)propyl)amino)propanoate, dimethyl (3-(trimethoxysilyl)propyl)aspartate, diethyl (3-(trimethoxysilyl)propyl)aspartate, N-propyl-3-((3-(trimethoxysilyl)propyl)amino)propanamide, 1-ethyl-3-((3-(trimethoxysilyl)propyl)amino)pyrrolidine-2,5-dione, or any combination thereof.

9. The composition of claim 1, wherein a backbone of the secondary diamine chain extender comprises polysiloxane.

10. The composition of claim 1, wherein the secondary diamine chain extender comprises an aliphatic or cycloaliphatic chain with secondary diamines.

11. The composition of claim 1, wherein the secondary diamine chain extender comprises a dimethylpolysiloxane chain with secondary diamines, a methylphenylpolysiloxane chain with secondary diamines, a polyether chain with secondary diamines, a polysulfide chain with secondary diamines, or any combination thereof.

12. The composition of claim 1, wherein the secondary diamine chain extender comprises tetraethyl 2,2'-((2-methylpentane-1,5-diyl)bis(azanediyl))disuccinate, tetraethyl 2,2'-((methylenebis(cyclohexane-4,1-diyl))bis(azanediyl))disuccinate, or any combination thereof.

13. The composition of claim 1, wherein 0 to 100% of the solids content, by weight, is the N-substituted urea polymer with extended chains and terminal alkoxysilanes.

14. The composition of claim 1, wherein the N-substituted urea polymer with extended chains and terminal alkoxysilanes comprises 50 to 90% of the solids content, by weight, and a catalyst, a reactive diluent, a pigment, a filler, an additive, or any combination thereof, comprises 10 to 50% of the solids content, by weight.

15. A substrate coated with the single-component coating composition of claim 1.

16. A method for making a single-component coating composition, comprising:
  synthesizing an N-substituted urea polymer with extended chains and terminal alkoxysilanes from
    an aliphatic polyisocyanate;
    an N-substituted amino-functional alkoxysilane; and
    a secondary diamine chain extender, wherein the secondary diamine chain extender comprises N-substituted groups that are ester-containing aliphatic; and
  mixing the synthesized polymer with a catalyst, a reactive diluent, a pigment, a filler, a solvent, an additive, or any combination thereof;
  wherein no unreacted isocyanate remains in the polymer.

17. The method of claim 16, wherein the N-substituted urea polymer with extended chains and terminal alkoxysilanes is a reaction product of:
  an aliphatic polyisocyanate with at least 2 isocyanate reactive groups per molecule;
  an N-substituted amino-functional alkoxysilane, wherein 30 to 95% of the isocyanate groups are reacted with said N-substituted amino-functional alkoxysilane; and
  a secondary diamine chain extender, wherein 5 to 70% of the isocyanate groups are reacted with said secondary diamine chain extender.

18. The method of claim 16, wherein the N-substituted urea polymer with extended chains and terminal alkoxysilanes is a reaction product of:
  an aliphatic polyisocyanate with at least 2 isocyanate reactive groups per molecule;
  an N-substituted amino-functional alkoxysilane, wherein 50 to 80%, and preferably 60 to 70%, of the isocyanate groups are reacted with said N-substituted amino-functional alkoxysilane; and
  a secondary diamine chain extender, wherein 20 to 50%, and preferably 30 to 40%, of the isocyanate groups are reacted with said secondary diamine chain extender.

19. The method of claim 16, wherein the aliphatic polyisocyanate is aliphatic or cycloaliphatic and comprises isocyanurates, biurets, uretdiones, allophanates, oxadiazinetrione iminooxadiazinediones, or any combination thereof.

20. The method of claim 16, wherein the N-substituted amino-functional alkoxysilane comprises N-methyl-3-aminopropyltrimethoxysilane, N-butyl-3-aminopropyltrimethoxysilane, N-butyl-3-aminopropylmethyldimethoxysilane, N-butyl-3-aminopropyltriethoxysilane, N-cyclohexyl-3-aminopropyltrimethoxysilane, butyl 3-((3-(trimethoxysilyl)propyl)amino)propanoate, 2-ethylhexyl 3-((3-(trimethoxysilyl)propyl)amino)propanoate, 3,3,3-trifluoropropyl 3-((3-(trimethoxysilyl)propyl)amino)propanoate, dimethyl (3-(trimethoxysilyl)propyl)aspartate, diethyl (3-(trimethoxysilyl)propyl)aspartate, N-propyl-3-((3-(trimethoxysilyl)propyl)amino)propanamide, 1-ethyl-3-((3-(trimethoxysilyl)propyl)amino)pyrrolidine-2,5-dione, or any combination thereof.

21. The method of claim 16, wherein the secondary diamine chain extender comprises tetraethyl 2,2'-((2-methylpentane-1,5-diyl)bis(azanediyl))disuccinate, tetraethyl 2,2'-((methylenebis(cyclohexane-4,1-diyl))bis(azanediyl))disuccinate, or any combination thereof.

22. The method of claim 16, wherein 0 to 100% of the solids content, by weight, is the N-substituted urea polymer with extended chains and terminal alkoxysilanes.

23. The method of claim 16, wherein the N-substituted urea polymer with extended chains and terminal alkoxysilanes comprises 50 to 90% of the solids content, by weight, and a catalyst, a reactive diluent, a pigment, a filler, an additive, or any combination thereof, comprises 10 to 50% of the solids content, by weight.

24. A substrate coated with the single-component coating composition made by the method of claim 16.

25. A single-component coating composition made by the method comprising:
  synthesizing an N-substituted urea polymer with extended chains and terminal alkoxysilanes from:
    an aliphatic polyisocyanate with at least 2 isocyanate reactive groups per molecule;
    an N-substituted amino-functional alkoxysilane; and
    a secondary diamine chain extender,
  wherein said aliphatic polyisocyanate and said N-substituted amino-functional alkoxysilane are reacted together to form an isocyanate-terminated intermediate and then said isocyanate-terminated intermediate is linked with said secondary diamine chain extender; and
  mixing the synthesized polymer with a reactive diluent, wherein the reactive diluent comprises polysiloxane with at least 2 hydrolyzable alkoxysilane groups; an alkyl-functional alkoxysilane, where the alkyl group is C1-C16 alkyl, cycloalkyl or fluorinated alkyl, and the alkoxysilane group is trimethoxysilane, triethoxysilane, methyldimethoxysilane, methyldiethoxysilane, dimethylmethoxysilane and dimethylethoxysilane; a polysiloxane-urea polymer with hydrolysable alkoxysilane groups; an aliphatic or cycloaliphatic N-substituted urea with hydrolysable alkoxysilane groups; or a polyester-urethane polymer with hydrolyzable alkoxysilane groups;
  wherein no unreacted isocyanate remains in the polymer.

26. The composition of claim 25, wherein the N-substituted urea polymer with extended chains and terminal alkoxysilanes is a reaction product of:
  an aliphatic polyisocyanate with at least 2 isocyanate reactive groups per molecule;
  an N-substituted amino-functional alkoxysilane, wherein 30 to 95% of the isocyanate groups are reacted with said N-substituted amino-functional alkoxysilane; and
  a secondary diamine chain extender, wherein 5 to 70% of the isocyanate groups are reacted with said secondary diamine chain extender.

27. The composition of claim 25, wherein the N-substituted urea polymer with extended chains and terminal alkoxysilanes is a reaction product of:
  an aliphatic polyisocyanate with at least 2 isocyanate reactive groups per molecule;
  an N-substituted amino-functional alkoxysilane, wherein 50 to 80%, and preferably 60 to 70%, of the isocyanate groups are reacted with said N-substituted amino-functional alkoxysilane; and
  a secondary diamine chain extender, wherein 20 to 50%, and preferably 30 to 40%, of the isocyanate groups are reacted with said secondary diamine chain extender.

28. The composition of claim 25, wherein the aliphatic polyisocyanate is aliphatic or cycloaliphatic and comprises isocyanurates, biurets, uretdiones, allophanates, oxadiazinetrione iminooxadiazinediones, or any combination thereof.

29. The composition of claim 25, wherein the N-substituted amino-functional alkoxysilane comprises N-methyl-3-aminopropyltrimethoxysilane, N-butyl-3-aminopropyltrimethoxysilane, N-butyl-3-aminopropylmethyldimethoxysilane, N-butyl-3-aminopropyltriethoxysilane, N-cyclohexyl-3-aminopropyltrimethoxysilane, butyl 3-((3-(trimethoxysilyl)propyl)amino)propanoate, 2-ethylhexyl 3-((3-(trimethoxysilyl)propyl)amino)propanoate, 3,3,3-trifluoropropyl 3-((3-(trimethoxysilyl)propyl)amino)propanoate, dimethyl (3-(trimethoxysilyl)propyl)aspartate, diethyl (3-(trimethoxysilyl)propyl)aspartate, N-propyl-3-((3-(trimethoxysilyl)propyl)amino)propanamide, 1-ethyl-3-((3-(trimethoxysilyl)propyl)amino)pyrrolidine-2,5-dione, or any combination thereof.

30. The composition of claim 25, wherein the secondary diamine chain extender comprises N-isopropyl-3-((isopropylamino)methyl)-3,5,5-trimethylcyclohexan-1-amine, $N^1,N^6$-bis(3,3-dimethylbutan-2-yl)hexane-1,6-diamine, tetraethyl 2,2'-((2-methylpentane-1,5-diyl)bis(azanediyl))disuccinate, tetraethyl 2,2'-((methylenebis(cyclohexane-4,1-diyl))bis(azanediyl))disuccinate, $N^1,N^3$-diethylpropane-1,3-diamine, $N^1,N^6$-dimethylhexane-1,6-diamine, or any combination thereof.

* * * * *